Sept. 9, 1924.
A. H. WADELL
GLARE ELIMINATOR
Filed Aug. 12, 1922
1,507,641
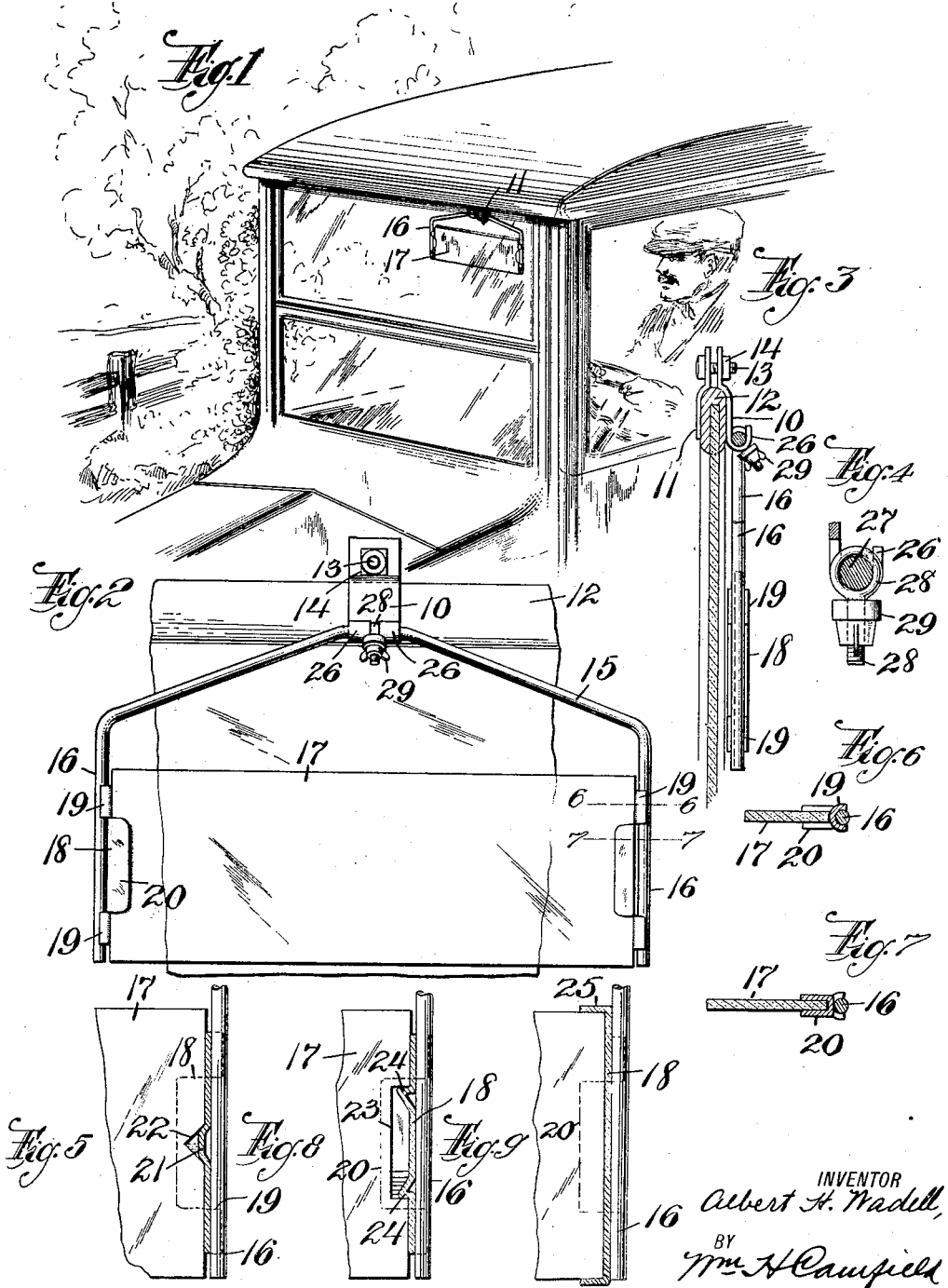
INVENTOR
Albert H. Wadell,
BY
Wm H Campfield
ATTORNEY.

Patented Sept. 9, 1924.

1,507,641

UNITED STATES PATENT OFFICE.

ALBERT H. WADELL, OF NEWARK, NEW JERSEY, ASSIGNOR OF ONE-HALF TO CARL E. ANDERSON, OF EAST ORANGE, NEW JERSEY.

GLARE ELIMINATOR.

Application filed August 12, 1922. Serial No. 581,292.

*To all whom it may concern:*

Be it known that I, ALBERT H. WADELL, a citizen of the United States, and a resident of Newark, county of Essex, and State of New Jersey, have invented certain new and useful Improvements in Glare Eliminators, of which the following is a specification.

This invention relates to a glare eliminator for wind shields and is designed to provide a structure that is easily attached to or detached from a wind shield, and which can be adjusted to adapt it to the height of the driver and also relative to the direction from which the glare comes.

The invention is also designed to provide a device of this kind which, while primarily a glare eliminator, can be adapted for other purposes, such as a shade.

The invention also resides in certain details of construction to be hereinafter more fully described and finally embodied in the claims.

The invention is illustrated in the accompanying drawing, in which Figure 1 is a perspective view of part of an automobile with the device in position. Figure 2 is an elevation of the improved glare eliminator, showing part of the wind shield. Figure 3 is a vertical section of the wind shield, the glare eliminator being shown in elevation, except the upper part of the frame, which is shown in section. Figure 4 is a detail sectional view of a clamp which may be used in the adjustment of the frame. Figure 5 is a detail section showing one form of clip for securing the plate in the frame. Figures 6 and 7 are horizontal sections taken on the lines 6—6 and 7—7, respectively, Figure 2, and Figures 8 and 9 are views similar to Figure 5, but showing modified forms of construction of the clip.

The device is preferably suspended on the inner side or face of a wind shield of an automobile or other conveyance, and is attached to the wind shield usually at the top thereof, and is preferably mounted so that it can be swung up out of the way when it is not needed, and in the form illustrated I show a bracket formed of two plates 10 and 11 which are adapted to clamp around the marginal rim or frame 12 of the wind shield by suitable means, such as the bolt 13 and the nut 14. The frame of the device is preferably an open frame, that is, the bottom is open so as to allow the lowering of the glass from the frame when necessary, and I show in the drawing a U-shaped frame having the cross arm 15 and the end arms 16, these end arms, when formed, usually being slightly out of parallel, that is, the ends are closer together at the bottom so that they can be spread to frictionally hold elements that are placed between them.

The plate 17 is held between the arms, this plate being usually made of transparent colored glass, such as amber or green glass, or it can be smoked glass, which will permit the free and unobstructed vision of anything that is seen through it, but will cut down the sharp or high lights such as those that are received from reflections or from the setting sun when riding toward it, or from glaring headlights.

The plate 17 is usually made so that it can be raised up and down and thus adjusted to the different heights of drivers, or it can be shifted according to the angle from which the light comes, and since this change of angle sometimes occurs quickly, such as when starting to climb a hill in the face of the sun, the adjustment should be simple and rapid. Such form of adjustment is shown in the drawing by the clips 18 which are provided with slides or troughs 19 which receive the end arms 16 of the frame, the clips having ears 20 which rest on either side of the plate 17 and are held tightly against it by reason of the normal spring action of the arms 16 toward each other. This action also prevents any rattling.

The glass can be held against any up and down movement within the clips by having a projection 21 on the clips, which projection on each clip fits into a notch or groove 22 in the plate 17, this being evident from Figure 5.

Modified forms of clips are shown in Figures 8 and 9, the one in Figure 8 showing a recess 23 in the end of the plate 17, and knobs or projections 24 are struck up from the material of the clips 18, and in Figure 9 I show the clips 18 provided with the top and bottom ears 25.

It will be evident from these different types that the clips can not be taken from the plate 17 in any direction except endwise, that is, they are held against lateral movement and are also held against up and down movement, but can be removed endwise, but only when the clips are slid entirely beyond the ends of the arms 16 of the U-shaped frame. This permits an adjustment up and down in the frame to the point where the clips entirely clear the ends of the arms 16. In other words, the plate 17 can be suspended below the ends of the arms 16, so long as the upper slides 19 are in engagement with the arms. This provides a considerable scope of adjustment, and at the same time permits the use of short arms 16, and thus a compact device when the device is used in its upper or normal position, as shown in Figure 2, is provided.

These various adjustments are needed because the driver wishes sometimes to eliminate the glare from the sun, which would require a relatively high point for the plate 17, whereas to eliminate later the glare from headlights, the plate 17 would have to be slid down to a much lower position.

To enable the device to be swung out of the way I prefer to attach the frame to the bracket 10 so that it swings thereon, and to illustrate this I show fingers 26 into which the straight or horizontal part 27 of the U-shaped frame rests, and an eye bolt 28 which is provided with a thumb screw 29, which thumb screw can be screwed up to bear on the lower part of the fingers 26 and can be pulled down by means of the eye bolt 28 and the cross arm of the frame, and thus tightly clamped to the frame in any tilted position that is desired, and can also be used to hold it horizontal in its raised position close up under the top of the automobile.

It will be evident that minor changes can be made in the proportions and arrangement of the parts without departing from the scope of my invention.

I claim:

1. A glare eliminator comprising an open frame having side arms with a spring action, clips, a transparent plate between the clips, the arms being pressed against the clips and the clips being pressed against the plate solely by the spring action of the arms.

2. A glare eliminator comprising a U-shaped spring frame, clips slidable on the frame, a plate secured between the clips, the parts being proportioned so that the arms of the U-shaped frame are under a spring tension when the plate and the clips are inserted between them.

3. A glare eliminator comprising a U-shaped spring frame, clips having slides for engaging the side arms of the frame and having ears, and a plate held between the ears of the clips all the parts being held assembled and adjustable by the spring action of the arms.

4. A glare eliminator comprising a bracket adapted to be secured to the frame of a wind shield, a U-shaped spring frame, a clamp for adjustably securing the U-shaped frame to the bracket, a transparent colored plate, clips removable endwise from the plate, the clips having slides to engage the arms of the U-shaped frame, the arms of the U-shaped frame holding the clips against the plate whereby the plate is adjustable by friction on the arms.

In testimony that I claim the foregoing, I have hereto set my hand, this 11th day of August, 1922.

A. H. WADELL.